United States Patent [19]

Musyck et al.

[11] Patent Number: 5,010,573
[45] Date of Patent: Apr. 23, 1991

[54] CRYPTOGRAPHIC SYSTEM BY BLOCS OF BINERY DATA

[76] Inventors: Emile P. Musyck, Amerikalaan 28, 2440 Geel; Christian E. Musyck, Rue de Bonlez 26, 5980 Grez Doiceau, both of Belgium

[21] Appl. No.: 515,236

[22] Filed: Apr. 27, 1990

[30] Foreign Application Priority Data

Apr. 28, 1989 [BE] Belgium ............................... 8900467

[51] Int. Cl.$^5$ .............................................. H04L 9/06
[52] U.S. Cl. ...................................................... 380/28
[58] Field of Search ..................................... 380/28, 50

[56] References Cited

U.S. PATENT DOCUMENTS

| 3,691,472 | 9/1972 | Bohman | 380/50 |
| 4,760,598 | 7/1988 | Ferrell | 380/50 |
| 4,760,600 | 7/1988 | Nakai | 380/28 |

OTHER PUBLICATIONS

"Specifications for the Data Encryption Standard", NBS Fibs Pub 46, 17, 1/77, pp. 273-285.
A. M. Odlyzko, "Discrete Logarithms in Finite Fields and their Cryptographic Significance", Eurocrypt, 1984, pp. 224-266.
Whitfield Diffie et al., "New Directions in Cryptography", IEEE Trans. on Info. Theory, vol. IT.22, No. 6, Nov. 1976, pp. 644-654.
D. Coppersmith, "Fast Evaluation of Logarithms in Fields of Characteristic Two", IEEE Trans. on Info. Theory, vol. 1T-30, No. 4, Jul. 1984, pp. 587-594.
R. L. Rivest et al., "A Method for Obtaining Digital Signatures and Public-Key Cryptosystems", MIT/LSC/TM82, Apr., 1977, pp. 1-15.
F. Blake et al., "Computing Logarithms in Finite Fields of Characteristic Two", Siam J. Alg. Disc. Meth., vol. 5, No. 2, Jun., 1984.

Primary Examiner—Salvatore Gangialosi
Attorney, Agent, or Firm—Cushman, Darby & Cushman

[57] ABSTRACT

This system concerns essentially an encoding algorithm through a unit of non-revealed key data. The OUTPUT vector of the algorithm DLM is given by the sequence number vector ke*s modulo(2exp(n)−1) of a linear sequence generated by a shift register of n bits, with ke being the number composing the encoding key and s the sequence number of the INPUT vector in this linear sequence in relation to a certain origin. We perform a double application of the algorithm DLM, with the input vector of the second application given by the result of the arithmetic product modulo(2exp(n)−1) of the exit vector of the first application by the encrypting key. By using the conjugated key kd, the same procedure allows to restore the input vector (FIG. 1). The encrypting velocity is equal to a quarter of the clock frequency.

13 Claims, 4 Drawing Sheets

CRYPTOGRAPHIC SYSTEM BY BLOCS OF BINERY DATA

This invention is relative to a cryptographic system which allows the conversion of a vector of n bits into an encrypted vector of n bits under the control of a crytographic key, k, formed by a vector, also of n bits, n being a whole number, preferably a number of Mersenne.

The safest method to encrypt a text consists of a modulo-2 addition of a strictly randomised sequence with the plain text. The same strictly randomised sequence added to the encrypted text allows on reception the restitution of the plain text. This procedure makes it necessary to provide the correspondent beforehand with a randomised key which will be as long as the message itself, and which will be used only once. This constitutes an unacceptable constraint for long messages used in civil cryptography.

However, it is possible to generate a pseudo-randomised sequence of an initialisation key introduced in an electronic circuit which has been specially conceived for such an application. To make this method valid, it is necessary that this sequence can not be reconstituted, even when the algorithm which has generated it, as well as a correspondence between ciphered and clear text are known. This sequence must be non linear, of practically infinite length and must also bear all the characteristics belonging to the randomised sequences. The major difficulty of this encrypting method is the realisation of a correct parallel between the generation of the pseudo-randomised sequences at the emission and at the reception.

To remove this constraint some different methods have been proposed: they aim at encrypting each block of n bits with the help of a reversible algorithm. This algorithm must be conceived so that it is not possible to reconstitute the encrypting key when the plain text and the corresponding encrypted text is known.

Currently, two different methods of encrypting exist: the first is the DES (Data Encryption Standard, NBS FIPS PUB 46, 17, Jan. 1977) and the other is the RSA proposed by (A method for obtaining Digital Signatures and Public-key Cryptosystems, Rivest, Shamir and Adleman, MIT/LCS/TM-82, Apr. 1977).

The DES algorithm is used world-wide and several integrated circuits incorporating this function are proposed by various firms. This algorithm utilises non-linear as well as linear transformations. These transformations have been designed in order to facilitate the use of the encrypting path in the opposite direction only when one uses the encrypting key. The DES system does not provide the advantage of the use of a key which has the same length as the data. In addition, the DES standard however bears some major disadvantages: firstly the lack of transparence. Indeed it uses several tables of special values. However, no theory proves that these adopted values constitute the most effective choice. In the absence of any valid explanation, the doubt exists that the algorithm could hide a "Trojan Horse".

The second method is the RSA method. This method allows the utilisation of the same algorithm for the encrypting phase and the decrypting phase, with conjugate keys. In addition the knowledge of one key does not allow the reconstitution of the secret key. This last special characteristic has given birth to public key cryptography. This is a new method which is extremely attractive for different applications specific to cryptography for civil use. The RSA standard is especially suitable for the exchange of secret keys by the initialisation of DES link between correspondents who do not have the communal secret key. To obtain this, the temporary secret key is encrypted with the secret key of the sender and then it is encrypted with the public key of the addressee. On reception the message will be returned by encrypting with the secret key of the addressee followed by an encrypting with the public key of the sender. The volume of calculations to be made for encrypting and decrypting is quite significant and that is why the RSA standard is relatively slow and is not highly recommended for a large utilisation.

One of the main aims of this invention is to propose an alternative solution to existing cryptographic systems.

Following this aim the cryptographic system of this invention, called SED "Secure European Device" comprises the means of allowing the use of the LM ("Discrete Logarithm Multiplier") algorithm for calculating from an input vector ES referred to as source vector and that corresponds to the data to be ciphered, an output vector Ed that corresponds to the ciphered text which is equal to the state of a linear shift register that corresponds to a register composed of n elements and of one feedback loop, at least, with the latter being formed by or-exclusive circuits, the inlets and outlets of which are linked to the outlets and the inlets of the elements of the register so as to obtain for this register the maximum possible length of $2 \exp(n) - 1$ for the sequence of the consecutive states, referred to as linear sequence, with each state of this register representing a jump, the origin of which is a reference vector referred to as "zero-origin", the value of the jump being the sequence number of this state in the linear sequence, with these means also being so designed that each jump may be expressed in the form of a linear relation REL as a function of the n first states of the linear sequence as from the "zero-origin" state, with the n states allowing for grouping in the form of n columns in view of achieving a square matrix referred to as MAT(0), with this matrix containing implicitly all the elements that characterize the shift register, with the aforesaid relation REL constituting an invariant for a jump that comprises an equal number of consecutive states of the linear sequence between the origin and the destination of the jump, with the origin of the jump corresponding to the first vector of a set of n consecutive states of the linear sequence grouped in columns in order to obtain a square matrix MAT(S) with the matrix product of MAT(S) times the vector REL, giving the destination of the jump, with the algorithm DLM allowing for searching for the aforesaid output vector while using this linear relation, the state of the linear sequence being defined by a jump counted from the reference vector "zero-origin" equal to k times the modulo $(2 \exp(n) - 1)$ jump that characterizes the source vector, with the jump corresponding to the output vector of the algorithm DLM being obtained through a succession of jumps put back to back and commencing at this reference vector, with these jumps being of two types, the first being equal to the jump from the reference vector to the source vector and the second being equal to the jump from the reference vector to the destination of the jump made last.

Favourably, the cryptographic system of the invention comprises the means to perform, in a specific sequence, a succession of operations, with each of these operations transforming an input vector into an output vector, with the latter vector used as an input vector in the following operation with this group of operations involving one or several applications of these algorithms DLM, the linear sequences of which are equal or different, with the aforesaid applications being followed and/or preceded by other jamming operations such as modular arithmetic multiplication, with the multiplier being equal to or different from the key used, or also a sequence of n operations such as permutations, substitutions or additions modulo-2 operated on the bits of the concerned vectors, the choice of these operations being determined by the value 1 or 0 of the nth bit of a secret vector, one of the keys for example, and with the sequence of succession of all operations being either the direct sequence or the inverse according to controls outside the system.

Further details and distinctive features of the invention will follow in the next description. This description should be considered as a non limiting example of any form of a particular realisation of the cryptographic system following the invention with reference to the enclosed figures.

Research in the field of discrete logarithm has been published in recent years (Discrete logarithms in finite fields and their cryptographic significance, A. M. Odllyzko, Eurocrypt 1984). These works which form the basis of the applied cryptanalysis of the system SED have demonstrated the possibilities for calculating the corresponding discrete logarithms to certain given vectors in a certain base, but this research can only be carried out by means of a semi-exhaustive search.

The SED system mainly uses a simple algorithm, called DLM algorithm ("Discrete Logarithm Multiplier"), which allows the swift calculation of the output vector whose discrete logarithm in a given logarithmic base is equal to the product of the number representing the encrypting key by the discrete logarithm of the input vector. One may note that the works of W. Diffies and M. E. Hellman (New directions in cryptography IEEE Trans Inform. Theory vol. IT-22, pp 644-654, 1976) and the DLM algorithm have the product of the logarithm by the key in common. The unique application of this algorithm does not provide any safety because the possible research of discrete logarithms from the input and output vector would allow an easy recalculation of the encrypting key. (Fast evaluation of logarithms in fields of characteristic of two, Don Coppersmith, IEEE trans. inform. theory vol IT-30, pp. 587-594).

The present invention is based on the fact that a double application of the algorithm DLM, in which the exit vector of the first application will have been transformed by a jamming function before being used as an entry vector for the second application, can present guarantee of safety if the setting of this jamming function cannot be assimilated into an application of the algorithm DLM from which the coefficient could be determined. Indeed, in this hypothesis, the exit vector of the first application which is not known, can be any vector of $2\exp(n)-2$ possible vectors. This is why the search for the key would require exhaustive research at the maximum level. We can note that a double application of the algorithm DLM without any transformation of the intermediary vector, would be equal to one single application of which the coefficient k would be equal to k1*k2.

The modular multiplication, a function which is easily reversible, can play the role of a jamming function between the two applications of the algorithm DLM. Indeed, the spaces of the discrete logarithms and the whole consecutive numbers are disconnected. Therefore, they unable the expression of a product which is related to consecutive applications made in different spaces. The multiplier coefficient can be equal to the encrypting key used in the algorithm DLM.

Simple reversible functions such as permutation, substitution or the modulo-2 addition of bits from one vector, used as a jamming function, are equivalent, at least in their impact, to an application of the algorithm DLM of which the multiplier coefficient can assume several possible values. The use of n simple functions, done in cascade, with the possible choice for each of them assuming the value 1 or 0 of the nth bit of the secret vector (the key for example) could introduce uncertainties of a scale $2\exp(n)$. The use of simple single one-to-one functions seems very attractive because it facilitates the construction of the hardware and does not produce carry overs in arithmetic additions. However, because of the necessity of having to make the jamming function reversible to decrypt, it is not possible to use a same key for the jamming function and the DLM algorithm.

Above all, the DLM algorithm is transparent: it allows one to understand easily the succession and the significance of the operations performed. The whole SED cryptographic system can be easily implanted in an integrated circuit. The size of the data blocs should be big enough so as to exclude every possibility of cryptanalyse by exhaustive research.

In order to allow an easier theoretical approach to the DLM, one will display this study in terms of shift registers where the order of numbers of the vectors in a linear sequence play the role of the discrete logarithm and where the characteristic polynomial of the shift registers correspond to the basis of the logarithm systems.

Let there be a shift register composed of n elements and having a maximum sequence of states length equal to $2\exp(n)-1$. Because these states are linked with each other by linear relations, one will call this a LINEAR SEQUENCE. By agreement, one designates following a particular form of realisation, the state of shift register where all the n elements are equal to 1, that is considered the ZERO-ORIGIN state of the linear sequence. Each state of the shift register can be designated by its sequence number in the sequence, the ZERO-ORIGIN state having the ZERO sequence number.

From the relation characterising a linear sequence, one has developed a method allowing one to establish the state of the register from which the sequence number in this linear sequence is equal to the sum of the order of numbers of the two given states, the sequence number of these ones being not known. This method allows one also to determine the states of register which has the double sequence number of the sequence number of a given state, the sequence number of the latter being not known. It also allows one to calculate the state having the sequence number $k * s$ modulo $(2\exp(n)-1)$ in the linear sequence, k being a given number under the form of a binary development and s the sequence number of a given state, called SOURCE, this number not being known.

In the DLM algorithm, the state of the shift register having a sequence number s, corresponds to the SOURCE text to encrypt, whereas the number k plays the role of the encrypting key. The encrypting result is given by the state of the register having the sequence number k * s. One can demonstrate that when carrying out two consecutive encryptings with the ke and kd keys, which verifies the relation ke * kd = 1 modulo (2 exp(n)−1), one can again find the initial text. The calculation of the conjugated keys is exposed in the works of Rivest. (A method for obtaining signatures and Public-key cryptosystems; Rivest, Shamir and Adleman, MIT/LCS/TM-82 Apr. 1977).

Following a particular form of realisation of the invention, the number of Mersenne 89 has been given as a value for the number n of bits of a binary bloc of data, so that 2 exp(89)−1 is a prime number.

It is interesting to note that 2 exp(89)−2 contains a large prime factor: 2931542417. Indeed, 2 exp(89)−2 = 2*3*5*17*23*89*353*397*683*2113*293-1542417 = 618970096426901374495621 10.

There are two structures of shift register with only one feedback loop provoking a maximum sequence. The following explanations concern the structure based on the characteristic polynomial P0+P51+P89=0 (version DLM-51) and are easily transferable to the characteristic polynomial P0+P38+P89=0 (version DLM-38). In the first structure, the element 51 is added modulo-2 to the element 89 to provide the element 1 of the state following the linear sequence, whereas all the other elements are shifted by one position to the right. A preference has been given to the first structure, because it is slightly more advantageous as far as the hardware realisation is concerned.

Each Es state belonging to the linear sequence of the shift register can be regarded as the destination of a jump beginning at the ZERO-ORIGIN, the value of this jump being the sequence number of the Es state in the linear sequence. The linear relation which links the Es state as a function of the first 89 states of the linear sequence generated from the ZERO-ORIGIN, can be written in the form of a matrix product:

$$Es = MAT(0) * REL \qquad (1)$$

MAT(0) being the square matrix formed by the first 89 states, and REL the linear coefficient. The vectors ES and REL are called JUMP and LINEAR RELATION respectively.

To establish this relation, it is necessary to consider the square matrix 89 * 89 formed by 89 columns corresponding to the 89 first states of the linear sequence, counted from the state ZERO-ORIGIN. All the elements m(i,1) of the first column, i ranging from 1 to 89, are equal to 1. In the column 2, the element m(1,2) is the only one equal to 0, whereas all the others are equal to 1. For each following column i, the element m(i−1,i) as well as the others situated higher up in the column are nil for all the values of i ranging from 2 to 52. At column 53, the m(1,53) element is the value of the sum modulo-2 of the elements m(51,52) and m(89,52), which is 1. The element m(1,J), for J going from 2 to 89, is equal to the modulo-2 sum of the elements m(51,J−1) and m(89,J−1). All the values 1 or 0 of the elements of the matrix glide following descending diagonals. The structure of the matrix is shown partially in table 1.

The matrix MAT(0) is not singular and has an inverse matrix which is represented in table 2. One can see that the inverse matrix is composed mainly of zeros, whereas the non-nil elements follow a very systematic arrangement mainly made up of four diagonals. Let us take relation (1) and calculate REL. One obtains easily the following:

$$REL = (MAT(0)) \exp(-1) * Es \qquad (2)$$

The vector REL is equal to the matrix product of the inverse matrix (MAT(0)) exp(−1) times the vector Es. The relation (2) establishes a single one-to-one transformation between the vectors REL and Es which characterise a jump. One can easily demonstrate that the vector REL constitutes a proper invariant to the number of states which characterises a jump and that it is independent of the origin used in the formation of the relation (2).

Figure 2:
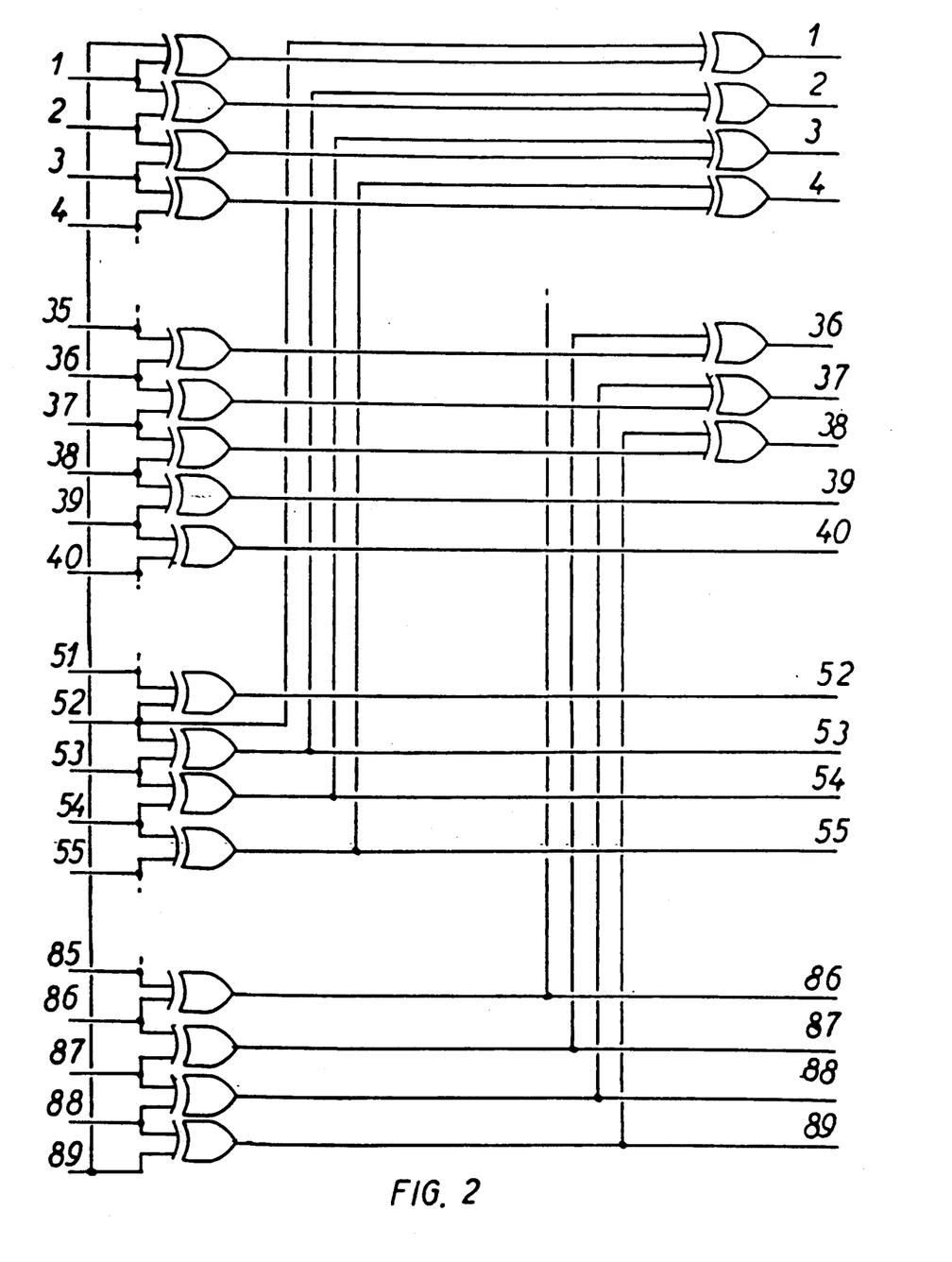
FIGS. 2, 3 and 4 describes certain details of the realisation of the hardware of the DLM algorithm.

One can note that this matrix product can be made in hardware by the network called LINEAR, formed by 127 circuits of the type OR-EXCLUSIVE whereas the DLM-38 version would require 141 circuits. FIG. 2 gives this linear network:

the 1st element of the REL vector is equal to the sum modulo-2 of the elements 1, 52 and 89 of the JUMP vector;

the index i elements, i ranging from 2 to 38, are equal to the sum modulo-2 of the four elements i−1, i, i+50 and i+51 of the JUMP vector;

the index i elements, i going from 39 to 89, are equal to the sum modulo-2 of the two elements i−1 and i of the vector JUMP.

The REL vector allows one to define a jump comprising a number of states equal to the number of states comprised between the ZERO-ORIGIN vector and the JUMP vector. The next step consists of researching a vector called the DESTINATION vector belonging to the same linear sequence and characterised by the same jump but carried out from any state of ORIGIN. The destination vector Ed is obtained by the matrix product $$Ed = MAT(S) * REL \qquad (3)$$

where MAT(S) designates the square matrix formed by the 89 consecutive states belonging to the linear sequence, the first column being the ORIGIN vector of the jump.

It is important to understand that all the elements of the first line of the first column of MAT(S) will reproduce themselves along the descending diagonals, which begin at these elements. The 89 elements of the left column are given by the ORIGIN vector of the jump. All the elements m(i,j) of the matrix MAT(S) are equal to the elements m(i−1,j−1), i and j ranging from 2 to 89, are equal to the modulo-2 sum of the elements m(51,j−1) and m(89, j−1) for the version DLM-51, which requires the utilisation of 88 OR-EXCLUSIVE circuits. Hence, all the elements of the matrix MAT(S) are determined by the ORIGIN vector.

The matrix product MAT(S) * REL will thus be realised in hardware by 7921 (89 * 89) knit according to a matrix structure. This structure will be operated vertically by the vector REL and diagonally by the ORIGIN vector. The result is called DESTINATION vector. Each element of this vector will be obtained by the modulo-2 sum of the output signals of the 89 knit belonging to the line corresponding to the rank of this element. In order to reduce to a minimum the delay caused by to the propagation of the output signal in the OR-EXCLUSIVE circuits, it is important that these ones are connected according to the structure of an inverted Christmas tree. This requires 88 OR-EXCLUSIVE circuits with two entrances per matrix line.

TABLE 1

|    | 0000000001..<br>1234567890.. | ..5555555556..<br>..01234567890.. | ..8888888888<br>..0123456789 |
|----|------------------------------|-----------------------------------|------------------------------|
| 01 | 1000000000.. | ..00011111111.. | ..1111111111 |
| 02 | 1100000000.. | ..00001111111.. | ..1111111111 |
| 03 | 1110000000.. | ..00000111111.. | ..1111111111 |
| 04 | 1111000000.. | ..00000011111.. | ..1111111111 |
| 05 | 1111100000.. | ..00000001111.. | ..1111111111 |
| 06 | 1111110000.. | ..00000000111.. | ..1111111111 |
| 07 | 1111111000.. | ..00000000011.. | ..1111111111 |
| 08 | 1111111100.. | ..00000000001.. | ..1111111111 |
| 09 | 1111111110.. | ..00000000000.. | ..1111111111 |
| 10 | 1111111111.. | ..00000000000.. | ..1111111111 |
| .. | ............ | ................ | ............ |
| 36 | 1111111111.. | ..00000000000.. | ..0000000011 |
| 37 | 1111111111.. | ..00000000000.. | ..0000000001 |
| 38 | 1111111111.. | ..00000000000.. | ..0000000000 |
| 39 | 1111111111.. | ..00000000000.. | ..0000000000 |
| .. | ............ | ................ | ............ |
| 50 | 1111111111.. | ..1000000000.. | ..0000000000 |
| 51 | 1111111111.. | ..1100000000.. | ..0000000000 |
| 52 | 1111111111.. | ..1110000000.. | ..0000000000 |
| 53 | 1111111111.. | ..1111000000.. | ..0000000000 |
| 54 | 1111111111.. | ..1111100000.. | ..0000000000 |
| 55 | 1111111111.. | ..1111110000.. | ..0000000000 |
| 56 | 1111111111.. | ..1111111000.. | ..0000000000 |
| 57 | 1111111111.. | ..1111111100.. | ..0000000000 |
| 58 | 1111111111.. | ..1111111110.. | ..0000000000 |
| 59 | 1111111111.. | ..1111111111.. | ..0000000000 |
| 60 | 1111111111.. | ..1111111111.. | ..0000000000 |
| .. | ............ | ................ | ............ |
| 80 | 1111111111.. | ..1111111111.. | ..1000000000 |
| 81 | 1111111111.. | ..1111111111.. | ..1100000000 |
| 82 | 1111111111.. | ..1111111111.. | ..1110000000 |
| 83 | 1111111111.. | ..1111111111.. | ..1111000000 |
| 84 | 1111111111.. | ..1111111111.. | ..1111100000 |
| 85 | 1111111111.. | ..1111111111.. | ..1111110000 |
| 86 | 1111111111.. | ..1111111111.. | ..1111111000 |
| 87 | 1111111111.. | ..1111111111.. | ..1111111100 |
| 88 | 1111111111.. | ..1111111111.. | ..1111111110 |
| 89 | 1111111111.. | ..1111111111.. | ..1111111111 |

MAT (0) matrix formed by the first 89 state vectors from the shift register from the vector ZERO-origin (11111111......1111111111)

TABLE 2

|    | 0000000001..<br>1234567890.. | ..5555555556..<br>..12345678900.. | ..888888888<br>..123456789 |
|----|------------------------------|-----------------------------------|----------------------------|
| 01 | 1000000000.. | ..01000000000.. | ..000000001 |
| 02 | 1100000000.. | ..01100000000.. | ..000000000 |
| 03 | 0110000000.. | ..00110000000.. | ..000000000 |
| 04 | 0011000000.. | ..00011000000.. | ..000000000 |
| 05 | 0001100000.. | ..00001100000.. | ..000000000 |
| 06 | 0000110000.. | ..00000110000.. | ..000000000 |
| 07 | 0000011000.. | ..00000011000.. | ..000000000 |
| 08 | 0000001100.. | ..00000001100.. | ..000000000 |
| 09 | 0000000110.. | ..00000000110.. | ..000000000 |
| 10 | 0000000011.. | ..00000000011.. | ..000000000 |
| .. | ............ | ................ | ............ |
| 36 | 0000000000.. | ..00000000000.. | ..000001100 |
| 37 | 0000000000.. | ..00000000000.. | ..000000110 |
| 38 | 0000000000.. | ..00000000000.. | ..000000011 |
| 39 | 0000000000.. | ..00000000000.. | ..000000000 |
| .. | ............ | ................ | ............ |
| 51 | 0000000000.. | ..10000000000.. | ..000000000 |
| 52 | 0000000000.. | ..11000000000.. | ..000000000 |
| 53 | 0000000000.. | ..01100000000.. | ..000000000 |
| 54 | 0000000000.. | ..00110000000.. | ..000000000 |
| 55 | 0000000000.. | ..00011000000.. | ..000000000 |
| 56 | 0000000000.. | ..00001100000.. | ..000000000 |
| 57 | 0000000000.. | ..00000110000.. | ..000000000 |
| 58 | 0000000000.. | ..00000011000.. | ..000000000 |
| 59 | 0000000000.. | ..00000001100.. | ..000000000 |
| 60 | 0000000000.. | ..00000000110.. | ..000000000 |
| .. | ............ | ................ | ............ |
| 80 | 0000000000.. | ..00000000000.. | ..000000000 |
| 81 | 0000000000.. | ..00000000000.. | ..100000000 |
| 82 | 0000000000.. | ..00000000000.. | ..110000000 |
| 83 | 0000000000.. | ..00000000000.. | ..011000000 |
| 84 | 0000000000.. | ..00000000000.. | ..001100000 |
| 85 | 0000000000.. | ..00000000000.. | ..000110000 |
| 86 | 0000000000.. | ..00000000000.. | ..000011000 |
| 87 | 0000000000.. | ..00000000000.. | ..000001100 |
| 88 | 0000000000.. | ..00000000000.. | ..000000110 |
| 89 | 0000000000.. | ..00000000000.. | ..000000011 | partial representation of the inverse matrix (MAT (0)) exp (−1) of the one in table 1

Each jump is characterised by two elements: its origin and its value. The origin is a state of the linear sequence, while the value of a jump is expressed relative to the corresponding state of that jump from the ZERO-ORIGIN. The introduction of a state vector (a vector corresponding to a state of the sequence) representing the value of a jump at the entrance of the linear network and of another state vector representing the ORIGIN vector in the left column of the MAT(S) matrix provokes the formation of the DESTINATION vector corresponding to the modulo (2 exp (89)−1) jump made from the ORIGIN vector. The arrival of the entrance signal in the DESTINATION register will be delayed because of the propagation of the various signals in the electronic circuits. Since the DESTINATION vector is used as the origin for the calculation of the following jump, this vector will have to be sampled in a minimum time limit after the introduction of the two vectors at the entrance of the linear network and the MAT(S) matrix. This time lapse is the major determinant of the encrypting velocity of the SED system.

The application of the DLM algorithm consists of the realisation of a succession of jumps, the first originating from the ZERO-ORIGIN state being found again in the DESTINATION register of the last jump. The origin of a jump is always the destination of the previous jump (or the ZERO-ORIGIN for the first jump), the first column of the matrix MAT(S) is connected to the exit of the DESTINATION register.

It is proposed to make a jump equal to k (1<k<2 exp(89)−1) times the jump of the ZERO-ORIGIN to any input vector put in a register called SOURCE, which corresponds to the text to be encrypted. For this, a set of operations will be made under the control of a PROGRAMMER circuit. Let us suppose that the register KEY contains the number k in binary form. At the initialisation, all the bits of the DESTINATION register are tuned to 1 because the succession of all the jumps starts at the ZERO-ORIGIN vector. A SCRUTINIZING circuit, coupled with a counter which can increment from 0 to 90, will examine each bit of the KEY register by starting with the most significant bit. The 0 state of the counter corresponds to the STANDBY position. At the time of the encrypting command, the regularly spaced clock pulses are transmitted to the sampling commands of the DESTINATION register. These pulses are also used to increment the counter of the SCRUTINIZING circuit. Two cases can then occur:

if the bit of the KEY register designated by the counter is equal to 0, the PROGRAMMER circuit must fulfil the mission of sampling the vector of the linear sequence of the sequence number 2 * no which is introduced at the entrance of the DESTINATION register, the output vector of this register having the sequence number no. This is why, a single clock pulse will increment both the counter and make the sampling of the DESTINATION register, the entrance of the linear network being connected at the exit of the DESTINATION register;

if the bit of the KEY register designated by the counter is equal to 1, the same above mentioned operation is valid, but in addition it is followed by another operation making the connected between the entrance of the linear network with the SOURCE register and the sampling of the DESTINATION register, which allows one to obtain the vector with the sequence number of 2 * no+s at the output of the last register, the DESTINATION register.

When the counter of the SCRUTINIZING circuit has achieved the number 90, the encrypting is finished and the result can be found in the DESTINATION register. Indeed, if the KEY k corresponds to the binary development:

$k = k89 * 2exp(88) + k88 * 2exp(87) + \ldots + k2 * 2 + k1$
where the bits $k89, k88, \ldots, k2$ and $k1$ adopt the values 1 or 0, the product:
$s * k = ((\ldots ((s * k89) * 2 + s * k88) * 2 + \ldots + s * k2) * 2 + s * k1$ can be made with a set of operations of two types: there are 88 multiplications by 2 and, if the bit ki is not nil, one addition. The ciphering of the DLM algorithm can be performed by an average of 135 jumps and the encryption velocity is equal to ⅓ of the clock frequency.

The cryptographic system SED in its elementary version comprises the DLM algorithms and the modular multiplication, all these operations using one same key. A more sophisticated version provides the utilisation of three different keys, one for each operation. By the deciphering, one uses conjugated keys in reversed order. The working keys are loaded in a conventional way.

The application of the cryptographic system following the invention will be described in detail below. The SED system is dedicated to make ciphering operations, encrypting and decrypting, but also authentification of electronic signatures in chained mode.

Two correspondents who do not have the communal secret key can be provided with a temporary key by an intermediary organisation which is officially registered for the distribution of those keys. To start with, each holder of a computer terminal equipped with the SED encrypting system is identified by an official number in the same way that everybody who is on the phone gets his personal phone number from the registered telecommunication organisation. When an SED integrated circuit comes off the production line, it will be given to the registered organisation, which will introduce a permanent secret key, appropriate for the SED system holder. The key kpa is the result of the ciphering of the public number na of the holder A made by one or more SED systems operating in cascade and using secret keys kro belonging to the registered organisation: kpa=SED(kro,na). For safety purposes, the SED system is designed so that it is neither possible to extract the permanent key out of the integrated circuit, nor the results of the ciphering made by this key. On the other hand, these results can be used as temporary ciphering keys for a normal utilisation. The registered organisation is the only one able to restore the kpa key, to calculate the conjugated key kpa' and create messages which can be received and deciphered by A using the permanent key kpa.

Before starting an encrypted connection, the correspondent A communicates his identification number in plain to the registered organisation, as well as the identification number of the correspondent B. With these two informations and the current time t1, the registered organisation is able to calculate the temporary key ktab=SED(kro,vabt) and the conjugated key ktab', the vector vabt being made up of na, nb and t1; one of the keys being intended to A, the other to B. This set of keys personalizes the link between A and B at time t1. The registered organisation returns a message with several blocs to A. The ciphering of the first bloc with the permanent key kpa gives the temporary key ktab which will be used by A for its link with B. The second bloc, deciphered with the ktab key provides in plain the vector vabt. Two other blocks coming from the registered organisation are ciphered by A with its ktab key, and transmitted to B. The ciphering by B with the permanent key kpb of the first bloc, gives the temporary key ktab' conjugated to ktab. The second bloc ciphered with the temporary key ktab' restores in plain, the vector vabt. By proceeding in this way, A and B will be able to authenticate their correspondents without any possibility of fraud and can therefore begin their secret communication.

The SED system put in the chained mode, can make a pseudo "one-way" ciphering in order to produce an electronic signature for plain messages exchanged between A and B. For doing this, A and B will encrypt separately the exchanged message in chained mode. In this procedure, the result of each encrypted bloc that is found in the DESTINATION register at the end of a bloc ciphering, is used as the ZERO-ORIGIN vector for the ciphering of the following bloc. The result of the last ciphered bloc provides the electronic signature of the message. The vabt vector is specially appropriated to be used as ciphering key. The scenario foresees the following steps: B returns his signature to A after ciphering with the ktab' key. A encryptes the message he received from B with the ktab key. If the restored signature of A is the same as the computed one, A will have the means to prove in an irrefutable way that B has received the message correctly after time t1. If A wishes to prove that he has received the message before time t2, A has to transmit this signature to the registered organisation, which will start a new procedure similar to the previous scenario, with the creation of a new temporary key which refers to time t2. The temporary key referring to time t2, received by A from the registered organisation, enables A to prove the existence of the signature before time t2. All these scenarios imply the perfect integrity of the registered organisation. To accept this way of proceeding, it is absolutely necessary that both the computing device of the organisation which carries out the calculation and the electronic clock allowing to establish times t1 and t2, remain in a closed device, placed in an restricted area. The above mentioned scenario could provide all the necessary arguments to claim irrefutably in front of a juridical authority that a message has been transmitted from A to B and correctly received by B after time t1 and before time t2.

The above mentioned scenario can be extended to the special case of a correspondent A with a large number of correspondents B receiving the same encrypted message sent by A. While proceeding with the registered organisation, A can distribute to each correspondent Bi a vector vi ciphered with his permanent key kpbi, which allows the reconstitution of the temporary key ktab' conjugated to the ktab key, used by A. The vi vector allocated to the Bi correspondent is not suitable for the Bj correspondent. One practical example of this scenario is illustrated by the following case: a meteorological satellite regularly sends pictures of the earth's surface. Only the station which will have paid the registration fees to receive signals from satellite A will be able to decrypt these meteorological pictures.

The figures which have been mentioned above will now be described in detail.

Figure 1:
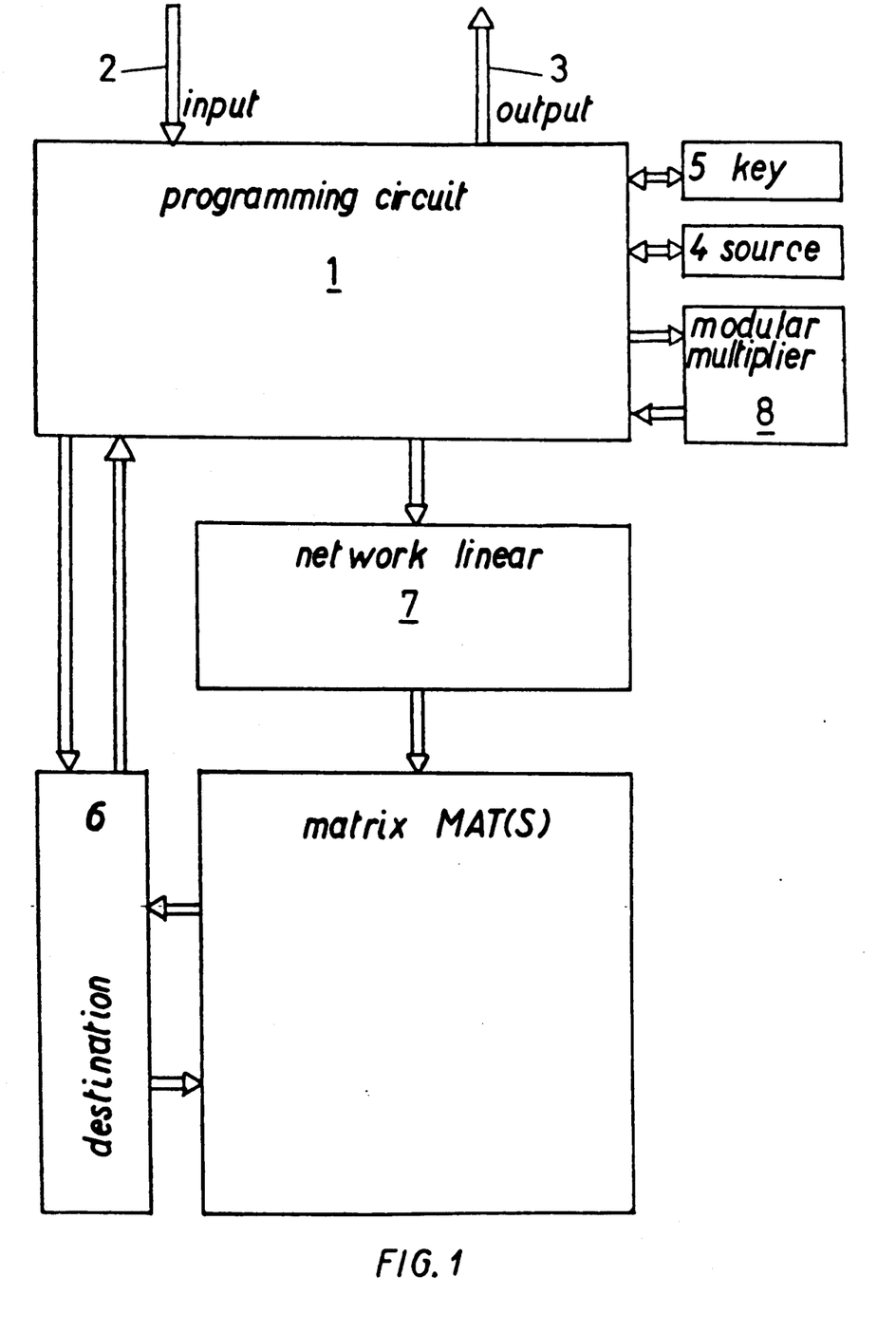
FIG. 1 shows a block diagram of the algorithm DLM.

FIG. 1 expresses in hardware what has been shown previously through a mathematical development and illustrates the progression of information between the different elements of the diagram bloc of the DLM algorithm. The programming circuit 1 manages the inputs 2 and outputs 3 of the data given via the registers SOURCE 4, KEY 5, and DESTINATION 6. It scrutinises the bits of the KEY 5 register and the command of the shunting of the information coming either from the register DESTINATION 6 or the register SOURCE 4 and going to the entrance of the network LINEAR 7. The matrix MAT(S) is commanded vertically by the output of the network LINEAR 7 and diagonally by the output of the register DESTINATION 6. The output information of the MAT(S) matrix is sampled in the register DESTINATION 6. The programming circuit 1 is also connected to the modular 8 multiplier circuit which produces the jamming of the intermediary vector of the two applications of the DLM algorithm.

FIG. 2 gives the structure of the LINEAR 7 network formed by 127 circuits OR-EXCLUSIVE (DLM-51). The 89 inputs of the network are represented partially on the left side of the figure. These inputs come from the 89 output signals coming either from the register SOURCE 4 or the register DESTINATION 6. The outputs 1 to 89 of the LINEAR 7 network are shown on the right side of the figure and correspond to the 89 commanding signals of the vertical network or columns of the MAT(S) matrix, the element 1 corresponds to the first column on the left and the element 89 corresponds to the last column on the right. As an example, one can note in this figure that the output 1 signal is equal to the sum modulo-2 of the input 1, 52 and 89 signals, and that the output 2 signal is a function of the input 1, 2, 52 and 53 signals. The non nil elements of the inverse matrix of table 2 indicate which are the input signals which intervene in the modulo-2 sum of the output signals.

Figure 3:
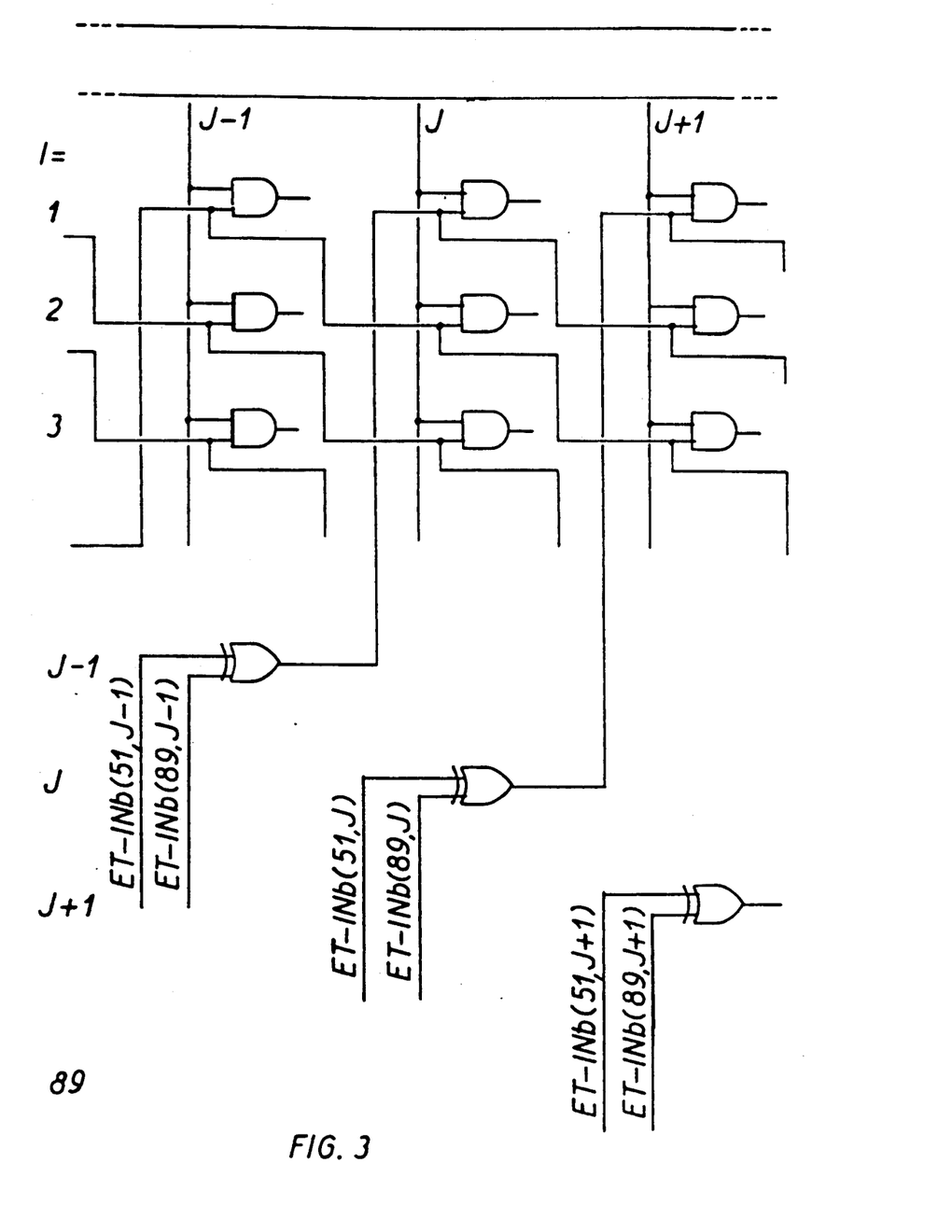

FIG. 3 shows the connections to both the entrances a and b of the gates ET situated at the first three lines and at the columns j−1, j and j+1 of the MAT(S) matrix. The vertical commands are given by the outputs of the LINEAR 7 network, whereas the command of the descending diagonal which begins at the entrance b of the ET gate of the column j of the first line is made by the sum modulo-2 of the signals of the two diagonal commands passing through the knit 51 and 89 of the column J−1. The structure of the two commanding networks of the MAT(S) matrix is illustrated by the relations $$\ldots = ET - INa(i - 1, j) =$$

$$ET - INa(i, j) = ET - INa(i + 1, j) = \ldots$$

and $$\ldots = ET - INb(i - 1, j - 1) =$$

$$ET - INb(i, j) = ET - INb(i + 1, j + 1) = \ldots$$

for the vertical and diagonal commands.

Figure 4:
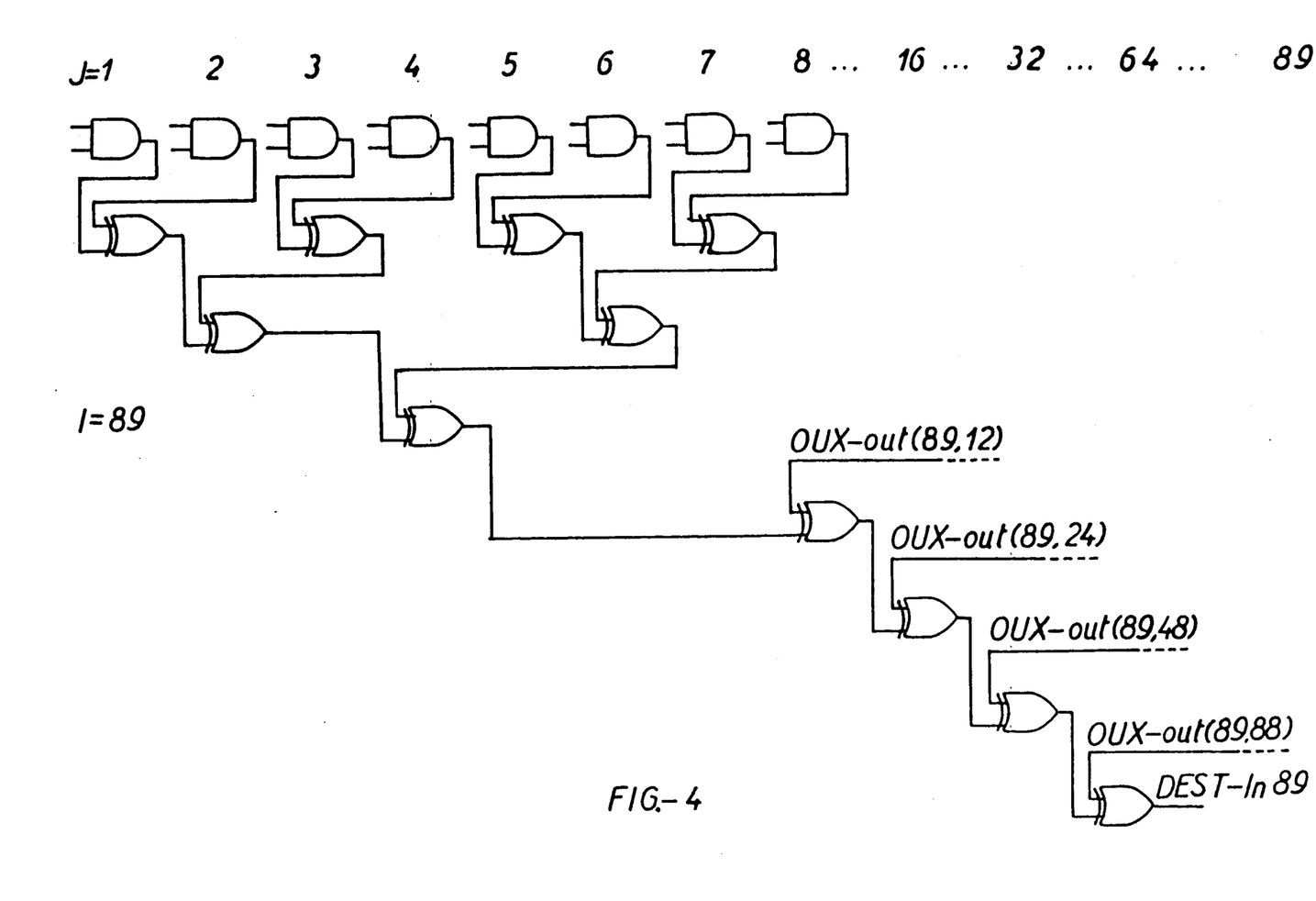

FIG. 4 shows the inverted Christmas tree structure of the connections of the OR-EX(i,j) circuits regarding the first 8 knits of the line 89. The OR-EXCLUSIVE circuit of the column 8 receives the signals of the columns 12 and 24. The circuit 32 groups together the signals 16 and 48. The signal coming from the circuit 64 constitutes the output signal of the line 89 from the MAT(S) matrix and is introduced at the entrance 89 of the DESTINATION 6 register. The circuit 80 which receives the signals coming from the circuits 72 and 84 as well as the circuit 88 which receives the signals of the circuit 80 and from the output of circuit ET (89, 89), are not showed on FIG. 4.

An example of the use of the SED system is given by the following results:
Encrypting key: 103DDCFE682C3200D75076F
Deciphering key: 0891D608FFF6B717CD0621A
Message: 1234567890ABCDEF1234567
DLM application result: 0DC6B3C9EE901586-D3ADB95
Modular multiplication result: 11AC6E1807C100E7F-5CA291
Second DLM application result: 0020A6E36F8-42ACA668D3AB While adopting the reversed order of the bits in the modular multiplication, one gets the following results:
First DLM application result: 0DC6B3C9EE901586-D3ADB95
Modular multiplication result: 1CE8AD531F-3CA77D3B1233B
Second DLM application result: 0F95799120CB23D95B1D5D0

The same calculations made with the conjugated key give the same results in a reversed order and restore the entrance message.

What we claim is:

1. A cryptographic system for converting a vector of data of n bits to a ciphered vector of n bits under the control of a cryptographic key that is formed by a vector of n bits, too, with n being a whole number comprising means that allows, using a DLM (discrete Logarithnm Multiplier) algorithnm, for calculating from an input vector Es referred to a source vector and that corresponds to the data to be ciphered, an output vector Ed that corresponds to the ciphered text which is equal to the state of a linear shift register that corresponds to a register composed of n elements and of one negative feedback loop, at least, with the latter being formed by or-exclusive circuits, the inlets and outlets of which are linked to the outlets and inlets of the elements of the shift register so as to obtain for this shift register the maximum possible length of 2 exp(n)−1 for the sequence of the consecutive states, referred to as linear sequence, with each state of this register representing a jump, the origin of which is a reference vector referred to as "zero-origin", and with the value of the jump being the sequence number of this state in the linear sequence, with these means also being so designed that each jump may be expressed in the form of a linear relation REL as a function of the n first states of the linear sequence as from the "zero-origin" state, with the n states allowing for grouping in the form of n columns in view of achieving a square matrix referred to as MAT(O), with this matrix containing implicitly all the elements that characterize the shift register, with the aforesaid relation REL constituting an invariant for a jump that comprises an equal number of consecutive states of the linear sequence between the origin and the destination of the jump, with the origin of the jump corresponding to the first vector of a set of n consecutive states of the linear sequence grouped in columns in order to obtain a square matrix MAT(S), with the matrix product of this matrix by the vector REL giving the destination of the jump, with the algorithm DLM allowing for searching for the aforesaid output vector while using this linear relation, the vector which corresponds to the state of the linear sequence being defined by a jump counted from the reference vector "zero-origin" equal to k times the modulo $(2 \exp(n)-1)$ jump that characterizes the source vector, with the jump corresponding to the output vector of the algorithm DLM being obtained through a succession of jumps put end to end and commencing at this reference vector, with these jumps being of two types, the first type being equal to the jump from the reference vector to the source vector and a second type being equal to the jump from the reference vector to the destination of the jump made last.

2. A system according to claim 1, wherein the reference vector "zero-origin" is chosen as having all the bits equal to 1.

3. A system according to claim 1, which comprises means designed to perform, in a specific sequence, a succession of operations, with each of these operations transforming an input vector into an output vector, with the latter vector used as an input vector in the following operation and with all of these operations involving one or several applications of the algorithm DLM relating to algorithms DLM, the linear sequences of which are equal to or different, with the aforesaid applications being followed and/or preceded by other operations such as the modulo $(2 \exp(n)-1)$ arithmetic multiplication, the multiplying coefficient of this one being equal to or different to the key used, or a sequence of other operations such as permutations, substitutions or modulo-2 additions made on the bits of the concerned vector, the choice of these operations being defined by the values 0 or 1 of the bits of a secret vector equal to or different from the encrypting key, the sequence of succession of all operations being either the direct sequence or the inverse sequence according to controls outside the system.

4. A system according to claim 3, which comprises means that allow for restoring a text encoded via the succession of the aforesaid operations in inverse sequence by using decrypting keys kd1, kd2, . . . kdn conjugated to the keys ke1, ke2, . . . ken where the set of keys i is being defined by the relation $kei * kdi = 1$ modulo $(2 \exp(n)-1)$, for the applications of the algorithm DLM as well as for the modular arithmetic multiplication and by applying also in inverse sequence the transformation functions operating the permutation, substitution or modulo-2 additions functions in their reciprocal forms.

5. A system according to the claim 1, wherein that means are provided for allowing to make, using the algorithm DLM, the aforesaid calculations in a number of program steps of less than 2*n, with each step being the object of a jump defined by the state factors that determine its value and its origin in the linear sequence, with the relation characterizing the value of the jump being obtained by the matrix product of the inverse matrix $(MAT(O))\exp - 1$ through the vector that determines the value of the jump, with the destination vector Ed of the jump being obtained by the matrix product of the square matrix MAT(S), with the latter containing implicitly the value of origin of the jump, through the vector REL, with the vector resulting from this product constituting the destination vector Ed of the jump, with the latter sampled in a destination registered to serve as the origin for the next jump.

6. A system according to claim 1, which comprises a programming circuit that ensures the control of the inputs and outputs of the vectors in the "source", "key" and "ciphered text" registers and that carries out the applications of the algorithm DLM as well as the modular arithmetic multiplication of the intermediary vector of two consecutive applications by a secret vector of n bits, which can be the key vector, with each application being carried out by entering first the reference vector "zero-origin" in the destination register Ed and the input vector in the source register Es, with the programming circuit allowing for examining, bit by bit, the "key" vector by commencing with the most significant bit and performing one single jump prior to examining the next bit, with this jump having, in this case, as origin and as value the output vector of the "destination" register, with the result of this jump being sampled in the destination register with the latter showing the doubling of the number of states in the linear sequence in relation to the preceding destination vector, with the programming circuit performing two jumps if the bit examined of the vector is equal to 1, with the first of these jumps providing, just as previously, the doubling of the jump from the reference vector "zero-origin" to the destination vector obtained with the previous step and performing then the jump with the value of the source vector Es, with each of the bits finally examined to the last and least significant bit of finally examined to the last and least significant bit of the key vector and with the result of the application of the algorithm DLM ending up thus in the destination register.

7. A system according to claim 1, wherein the aforesaid means are arranged in such a manner that the aforesaid number n is equal to 89 and that the shift register comprises one single feedback loop formed by an OR-exclusive circuit where the inlet of the element 1 of the shift register receives the logical value of the modulo-2 sum of the values of the elements 51 and 89 of the preceding state, thus constituting the algorithm DLM-51 or the logical value of the modulo-2 sum of the values of the elements 38 and 89, constituting the algorithm DLM-38.

8. A system according to claim 7, wherein the aforesaid means are such that the linear relation REL that links the jump value vector to the 89 first states of the shift register from the reference vector "zero-origin" is given by the linear network of OR-exclusive circuits, with the inlet of this network being connected either to the outlet of the destination register or the source register, with the vector REL defined by the following characteristics: in the case of the algorithm DLM-51, the element 1 is equal to the modulo-2 sum of the values of the element 1,51 and 89 of the vector at the inlet of the LINEAR network, with the index elements i of the vector REL, i ranging from 2 to 38, being equal to the modulo-2 sum of the four elements $i-1$, i, $i+50$ and $i+51$ of the vector at the inlet of the LINEAR network and the index elements i, i ranging from 39 to 89, being equal to the modulo-2 sum of the two elements $i-1$ and i of the vector at the inlet of the LINEAR network.

9. A system according to claim 8, wherein the aforesaid means are such that the left column of the matrix MAT(S) is given by the output vector for the destination register and that the element (i,j), i and j ranging from 2 to 89 is equal to the elements $(i-1, j-1)$, with the element (1,j) being equal to the modulo-2 sum of the elements$(51,j-1)$ and $(89,j-1)$ in the algorithm DLM-51.

10. A system according to claim 9, wherein the aforesaid means are so designed that the element i of the input vector of the destination register is equal to the modulo-2 matrix product of the vector formed by the i-nth line of the square matrix through the vector REL i.e. the modulo-2 sum of the output signals of the 89 logical circuits AND at two inlets, with the j-nth circuit having one inlet connected to the element j of the vector REL of the vertical network and with the other inlet connected to the descending diagonal that serves the element (i,j) of the matrix MAT(S).

11. A system according to claim 1, wherein all the electronic circuits of the logical functions of the cryptographic system SED are realised in a single integrated circuit that also comprises the elements needed for entering data stored in a permanent storage unit with a view to using them as permanent cryptographic keys, whose ciphering results made with these last keys can only be used for the creation of new temporary keys, the temporary and permanent keys being not able to be read or extracted outside the integrated circuit, the use of these different keys being directed from outside.

12. A system according to claim 1, which comprises an external command of the integrated circuit allowing the installation of the DLM algorithm in the chained mode, where the result of ciphering of each block, located in the destination register, remains in this destination register during the ciphering of the next block, the result of the last ciphering being the signature of the referred plain message, relative to a non secret key, defined in an arbitrary way.

13. A keys distributing system comprising one or more SED systems operating in cascade being able to communicate with a terminal comprising a SED system, all these systems SED according to claim 1, which comprises an electronic clock and means allowing to receive messages from the above mentioned terminal, to make one or more ciphering operations in cascade on the received messages with the secret keys it holds, to calculate the conjugated keys related to the deciphered vector by one or more SED systems internal to the keys distribution system, to make one or more ciphering operations on the computed conjugated keys as well as other vectors referring to the time indicated by the electronic clock in one or more internal SED systems while using the same secret keys that it is holding, these means as well as the electronic clock and the one or more SED systems being placed in an enclosed space, protected physically in order to avoid every possibility of access or modification of the informations related to the calculation of the conjugated keys and to the functioning of the electronic clock.

* * * * *